C. L. KELLING.
Oyster Can Cover.
No. 26,907. Patented Jan'y 24, 1860.
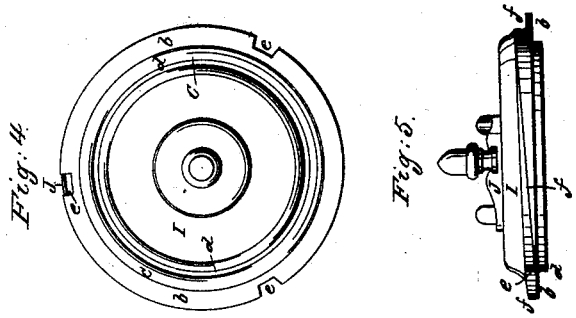
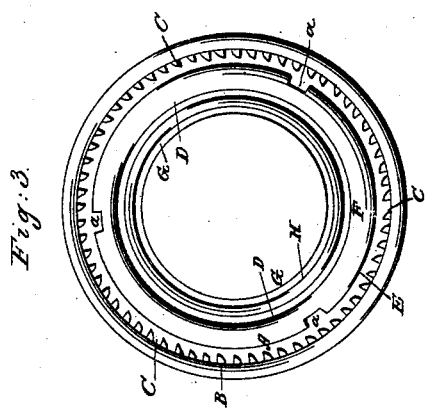
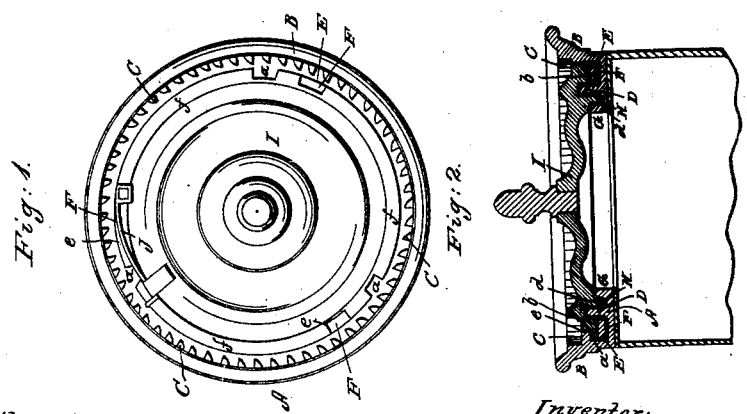
Witnesses: Inventor: C. L. Kelling

UNITED STATES PATENT OFFICE.

CHARLES L. KELLING, OF MECHANICSBURG, PENNSYLVANIA.

IMPROVEMENT IN PRESERVE-CAN COVERS.

Specification forming part of Letters Patent No. 26,907, dated January 24, 1860.

*To all whom it may concern:*

Be it known that I, CHARLES L. KELLING, of Mechanicsburg, in the county of Cumberland and State of Pennsylvania, have invented a new and useful Improvement in Covers for Oyster-Cans, &c.; and I do hereby declare that the following is a full, clear, and exact description of the same, reference being had to the accompanying drawings, forming a part of this specification, in which—

Figure 1 is a plan of the cover complete. Fig. 2 is a vertical section of the same applied to a can. Fig. 3 is a plan of the cover with the movable portion removed. Fig. 4 is an inverted plan of the movable portion, and Fig. 5 is a side or edge view of the same.

Similar letters of reference in each of the several figures indicate corresponding parts.

My invention consists in a flanged annular plate which is constructed with ratchet-teeth, lugs, one or more raised beads, and one or more circular grooves or recesses between its inner and outer circumferences, in combination with a disk which has a series of inclined planes, a groove and one or more beads, and a spring-pawl or its equivalent, all as hereinafter described.

To enable others skilled in the art to make and use my invention, I will proceed to describe its construction and operation.

A represents a cast-iron annular plate, adapted for being fitted on the top of an oyster, paint, or other can, as shown in Fig. 2. This plate has a flaring flange, B, which has ratchet-teeth C cast on its inner circumference near its upper edge, said flange also having a series of lugs, *a a a*, cast on it just below the ratchet-teeth.

D is a circular raised bead cast on the upper surface of the plate A. This bead serves, with the flange B, to form a circular groove, E, for the introduction of a flat annular gasket, F, of india-rubber, in the manner illustrated by the red tint.

G is another raised circular bead, situated just at the central opening of the plate A. This bead forms a secondary groove, H, which, although not furnished with a rubber gasket, serves to assist in isolating the rubber gasket of the main groove, which forms the air, water, or vapor tight joint, from the contents of the can, and also to retard the passage of the juice, sirup, or vapor to said main groove.

I is what I term the "movable disk" for closing up the annular opening of the plate and can. This disk is cast with a bead, *b*, to fit down upon the rubber gasket, with a groove, *c*, to receive the bead D, and with a bead, *d*, to fit into the groove H, as represented. It is also cast with recesses *e e e* in its circumference to admit the lugs *a a a a*, and with inclined planes *f f* on its upper surface near its circumference, so that when it is turned a binding action between it and the lugs shall be obtained, and the rubber gasket constantly subjected to considerable pressure, and thereby made to form an air-tight joint between the plate A and the movable disk.

J is a spring-pawl attached to the top of the disk I, so that it comes in contact with the annular toothed portion of the plate, and falls between two of said teeth after the proper tension has been brought to bear upon the rubber gasket by the inclined planes and lugs, and thus holds the disk against any possibility of slipping back when the cans are subjected to a sudden jar or are rolled about. The spring catch or pawl is shaped so as to slip over the teeth when it is desired to remove the disk. It may, however, be pivoted so as to be thrown around out of the way while the disk is being screwed on or off.

It is quite essential to have the ratchet-teeth formed on the plate A and a catch or pawl to lock into the same, for very often oyster, paint, and other cans are rolled about with considerable force, and consequently the inclined planes lose their hold and allow the disk to slip back and the joint to open sufficiently for air to insinuate itself, or the juice or vapor to escape from the interior of the can.

What I claim as my invention, and desire to secure by Letters Patent, is—

A flanged annular plate, A, which is constructed with ratchet-teeth C, lugs *a a*, one or more raised beads, D G, and one or more circular grooves or recesses, E H, between its inner and outer circumferences, in combination with a disk, I, which has a series of incline planes, *f f*, a groove, *e*, and one or more beads, *b d*, and a spring-pawl, J, or its equivalent, substantially as and for the purposes set forth.

The above specification of my improved oyster-can covers, &c., signed by me this 20th day of December, 1859.

C. L. KELLING.

Witnesses:
 GOODWIN Y. ATLEE,
 R. W. FENWICK.